(12) United States Patent
Yang et al.

(10) Patent No.: US 7,574,742 B2
(45) Date of Patent: Aug. 11, 2009

(54) SYSTEM AND METHOD OF STRING MATCHING FOR UNIFORM DATA CLASSIFICATION

(75) Inventors: Tzy-Jian Yang, Taipei (TW); Kuan-Ming Lin, Taipei (TW); Shing-Hung Lee, Kaohsiung (TW); Shyhtsun Felix Wu, Davis, CA (US)

(73) Assignees: Industrial Technology Research Institute, Hsinchu (TW); The Regents of the University of California, Oakland, CA (US)

( * ) Notice: Subject to any disclaimer, the term of this patent is extended or adjusted under 35 U.S.C. 154(b) by 748 days.

(21) Appl. No.: 10/986,865

(22) Filed: Nov. 15, 2004

(65) Prior Publication Data

US 2006/0104518 A1    May 18, 2006

(51) Int. Cl.
*G06F 12/14* (2006.01)
(52) U.S. Cl. ...................................................... 726/24
(58) Field of Classification Search ........................ None
See application file for complete search history.

(56) References Cited

U.S. PATENT DOCUMENTS

| | | | |
|---|---|---|---|
| 5,265,004 A | 11/1993 | Schultz et al. | |
| 5,440,336 A | 8/1995 | Buhro et al. | |
| 5,459,798 A | 10/1995 | Bailey et al. | |
| 5,664,092 A | 9/1997 | Waites | |
| 5,781,772 A | 7/1998 | Wilkinson, III et al. | |
| 5,825,921 A | 10/1998 | Dulong | |
| 5,881,312 A | 3/1999 | Dulong | |
| 5,995,971 A | 11/1999 | Douceur et al. | |
| 6,014,659 A | 1/2000 | Wilkinson, III et al. | |
| 6,041,053 A | 3/2000 | Douceur et al. | |
| 6,094,443 A | 7/2000 | Dwork | |
| 6,108,666 A | 8/2000 | Floratos et al. | |
| 6,122,757 A | 9/2000 | Kelley | |
| 6,295,524 B1 | 9/2001 | Yianilos et al. | |
| 6,338,061 B1 | 1/2002 | Shimomura | |
| 6,393,486 B1 | 5/2002 | Pelavin et al. | |
| 6,819,653 B1 * | 11/2004 | Hodgins et al. | ............. 370/233 |
| 7,277,766 B1 * | 10/2007 | Khan et al. | .................... 700/94 |
| 2006/0015630 A1 * | 1/2006 | Stolfo et al. | ................. 709/230 |

\* cited by examiner

*Primary Examiner*—Brandon S Hoffman
(74) *Attorney, Agent, or Firm*—Finnegan, Henderson, Farabow, Garrett & Dunner LLP (57) ABSTRACT

A system and method comprising providing a plurality of signature strings, inputting a plurality of strings, separating the signature strings into a plurality of signature groups, respectively detecting common features for the signature strings for each of the signature groups and the input strings, comparing the detected common features for each of the signature groups with those of the input strings, and matching the input strings and the signature groups if the detected common features for the signature groups match those of the input strings. In one aspect, the string matching further comprises matching the input strings with the signature strings for those of the signature groups having common features that match the common features of the input strings. In another aspect, the common features comprise distances or gaps between characters in the input strings and the signature strings.

24 Claims, 10 Drawing Sheets

S₂ = | p | q | r | s | t | u | gVector(S):    | 0 | 0 | ... | 0 | 1 | 0 | ... | 0 | 1 | 0 | ... | 0 | 1 | 0 | ... | 0 |
                                −25                     1                    27 gVector(S₁):   | 0 | 0 | ... | 0 | 1 | 0 | ... | 0 | 1 | 0 | ... | 0 | 0 | 1 | 0 | ... | 0 | gVector(S₂):   | 0 | 0 | ... | 0 | 0 | 0 | ... | 0 | 1 | 0 | ... | 0 | 0 | 0 | 0 | ... | 0 |

Fig. 5

Parameter

*Groups* = 3

Members of each group = 7/3 = 2

*Toleration* = 1

Searched tolerated sum = 2+1 ~ 2-1

|  | -3 | -2 | -1 | 0 | 1 | 2 | 3 |
|---|---|---|---|---|---|---|---|
| signature1 | 1 |  |  |  |  |  |  |
| signature2 |  | 1 | 1 |  | 1 | 2 |  |
| signature3 |  |  | 1 | 0 | 1 |  |  |
| signature4 |  |  | 1 |  |  | 1 |  |
| signature5 |  | 1 | 1 | 1 | 1 |  |  |
| signature6 | 1 |  | 1 | 1 | 1 |  |  |
| signature7 | 2 | 3 | 4 | 1 | 4 | 2 | 0 |

Search Direction

| 4 | 4 | 3 | 2 | 2 | 1 | 0 |
|---|---|---|---|---|---|---|

Toleration sum sorted

SYSTEM AND METHOD OF STRING MATCHING FOR UNIFORM DATA CLASSIFICATION

BACKGROUND OF THE INVENTION

1. Field of the Invention

The present invention generally relates to data classification systems and processing and, more particularly, to a string matching method and system for uniform data classification.

2. Description of the Related Art

String matching methods are widely used in systems such as intrusion detection systems, virus detection systems, and data mining systems. To detect an intrusion or a virus, a local system utilizes a matching method to search a received message for any of a predetermined set of strings, and treats the message accordingly based on the matching results. Each of the messages and the predetermined set of strings may include a number of characters or symbols. The received message may be referred to as the text, the predetermined set of strings may be referred to as a patterns set, and each member of the patterns set may be referred to as a pattern. A match is said to occur if a pattern is identical to a substring of the text.

For instance, virus detection systems can provide detection of potentially harmful data being input into data systems. A signature database is provided with a plurality of character strings that are considered harmful to data. A packet of input data is directed to the signature database for comparison with the stored character strings. After string matching, the virus detection system determines whether the input data packet is considered harmful. Remedial actions are accordingly taken if the input data packet is determined to be harmful.

Conventional string matching requires one-to-one comparison between strings stored in the signature database with each input data packet. Delay is likely to result when a large number of data packets are being input into the system, or if a large number of potentially harmful strings are stored in the signature database. System and processor resources required for implementing the string matching become unduly large if a large number of strings will need to be compared.

There is thus a general need for a system and method overcoming at least the aforementioned shortcomings in the art. A particular need exists in the art for a system and method overcoming disadvantages with respect to inefficiencies and delay in one-to-one string matching.

BRIEF SUMMARY OF THE INVENTION

Accordingly, an embodiment of the present invention is directed to a system and method of string matching using alphabet gap classification that obviate one or more of the problems due to limitations and disadvantages of the related art.

To achieve these and other advantages, and in accordance with the purpose of the present invention as embodied and broadly described, there is provided a data system comprising a signature database storing a plurality of signature strings wherein the signature strings are separated into a plurality of signature groups, a detector to detect common features for the signature strings for each of the signature groups, and input strings being input into the data system, respectively, and a match module to compare the detected common features for each of the signature groups with those of the input strings, wherein the input strings are matched with the signature groups if the detected common features for the signature groups match those of the input strings.

Also in accordance with the present invention, there is provided a string matching method comprising providing a plurality of signature strings, inputting a plurality of strings, separating the signature strings into a plurality of signature groups, respectively detecting common features for the signature strings for each of the signature groups and the input strings, comparing the common features for each of the signature groups with those of the input strings, and matching the input strings and the signature groups if the common features of at least one of the signature groups match the detected common features of the input strings.

Additional features and advantages of the present invention will be set forth in part in the description which follows, and in part will be obvious from the description, or may be learned by practice of the present invention. The features and advantages of the present invention will be realized and attained by means of the elements and combinations particularly pointed out in the henceforth appended claims.

It is to be understood that both the foregoing general description and the following detailed description are exemplary and explanatory only and are not restrictive of the present invention, as claimed.

The accompanying drawings, which are incorporated in and constitute a part of this specification, illustrate several embodiments of the present invention and together with the description, serve to explain the principles of the present invention.

DESCRIPTION OF THE EMBODIMENTS

Reference will now be made in detail to present embodiments of the present invention, examples of which are illustrated in the accompanying drawings. Wherever possible, the same reference numbers will be used throughout the drawings to refer to the same or like parts.

Figure 1:
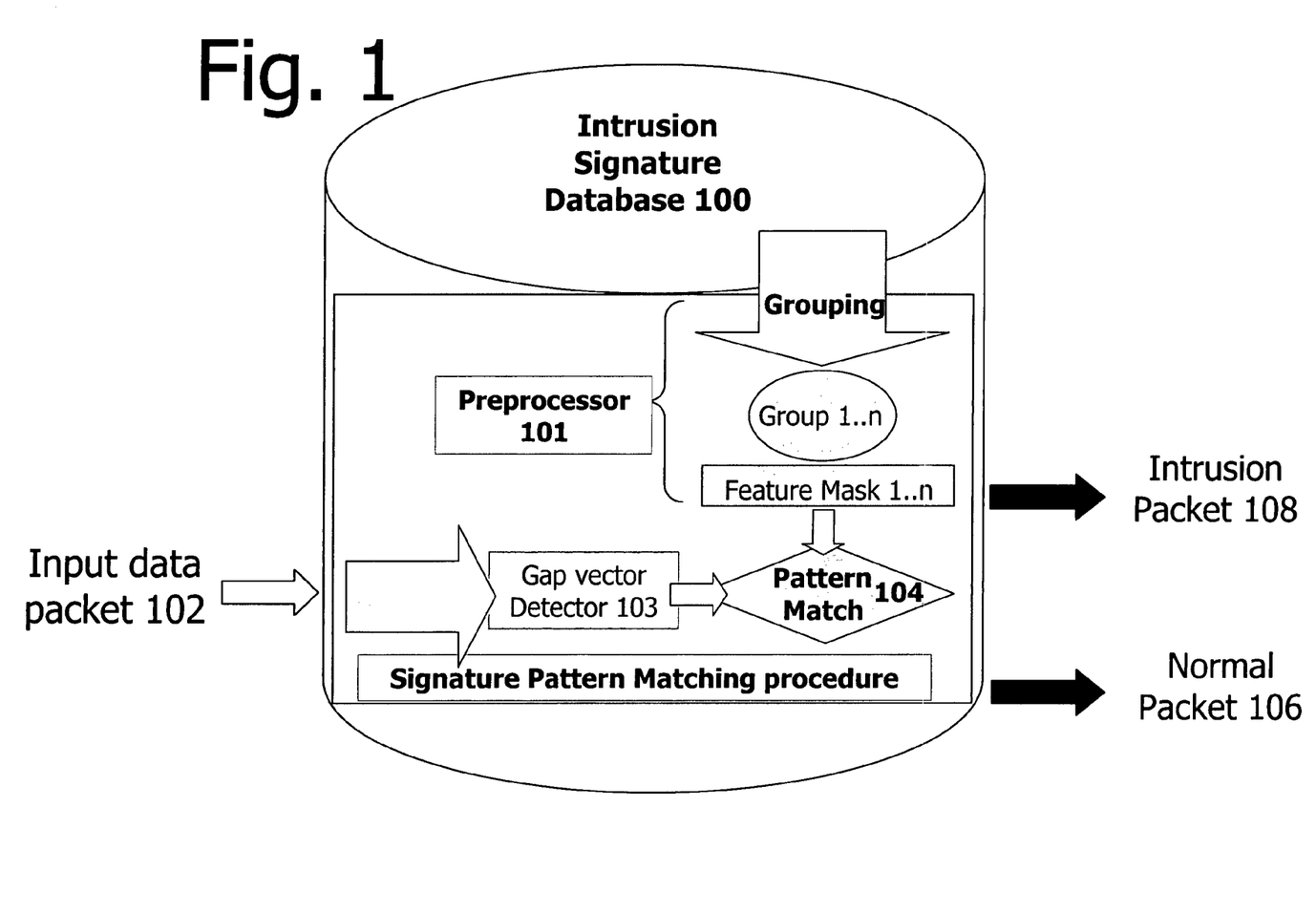
FIG. 1 is a block diagram that illustrates an example of a signature database with string matching in a system according to an embodiment of the present invention.

FIG. 1 is a block diagram that illustrates an example of an intrusion signature database 100 of signature strings in a data system according to an embodiment of the present invention. FIG. 1 shows a plurality of strings 102 being input into the data system (e.g., input data packet 102), intrusion signature database 100 storing a plurality of signature strings in the system wherein the signature strings are separated into a plurality of signature groups, a detector (not shown in FIG. 1) for detecting common features of the signature strings for each of the signature groups and the input strings, and a match module 104 in the signature database for comparing the detected common features for each of the signature groups with those of the input strings. A detector 103 takes the input data packet 102 and detects its gap vectors. A preprocessor 101 takes the grouping of signature strings from a database 100, and puts them in the form of feature masks 1, 2, ... n, which are matched with the gap vectors output from detector 103. The signature database can be updated with additional or revised signature strings. Character-to-character comparison is performed for the input strings with one or more of the signature groups if the detected common features for the signature groups match those of the input strings. If they do not match, the input data packet is considered a normal packet 106. If they do match, the input data packet is suspect as an intrusion packet 108.

In one aspect, it is not necessary for an input string to be matched with all signature groups. In another aspect, the input and signature string matching is transparent to search algorithms and policy rules on what constitutes a signature string. That is, search algorithms and policy rules remain the same and need not be changed when the input and signature string comparison consistent with the present invention is being implemented. As a result, normal packets advantageously pass through the signature database as quickly as possible, whereas intrusion packets are detected as soon as possible as well. Intrusion packets, when detected, are purged from the system.

Figure 2:
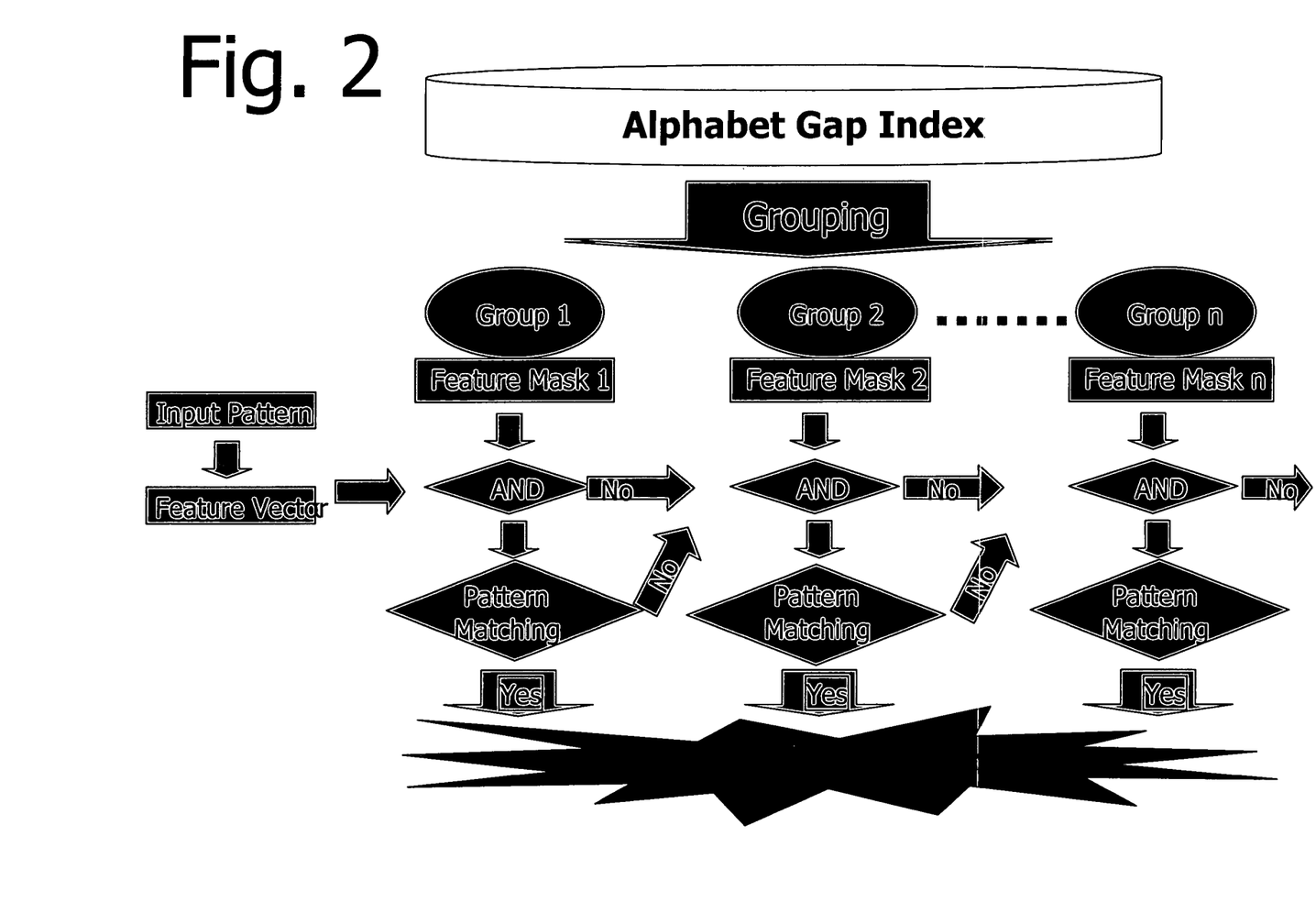
FIG. 2 is a flow diagram that illustrates an example of a string matching method for data classification according to an embodiment of the present invention.

FIG. 2 is a flow diagram that illustrates an example of a string matching method according to an embodiment of the present invention. The string matching method comprises providing a plurality of signature strings, inputting a plurality of strings, separating the signature strings into a plurality of signature groups (e.g., signature groups 1, 2, ... n), and respectively detecting common features for the signature strings for each of the signature groups and the input strings. Such detection can be performed by creating feature masks, as more fully described herein. The method further includes comparing the detected common features for each of the signature groups with those of the input strings, and matching the input strings and the signature groups if the detected common features for the signature groups match those of the input strings. In one aspect, it is not necessary to match all signature groups. In another aspect, the common features comprise distances or gaps between characters in the input strings and the signature strings. The character gaps can be quantified in a plurality of gap vectors and, subsequently, gap vector matrices. Moreover, the common features in a signature group can be extracted into a plurality of feature masks, which are presented as a signature group's individual vector, e.g., feature masks 1, 2, ... n as shown in FIG. 2.

In a simpler mathematical form, if string S includes string s, then gVector(S) includes gVector(s). In one aspect, the string matching method further comprises matching the input strings with the signature strings for those of the signature groups that matched the input strings. If they do not match, the input data is considered normal. If they do match, the input data is suspect as intrusive or possibly virus-affected data. The input data that match any of the signature strings are purged from the system.

Figure 3:
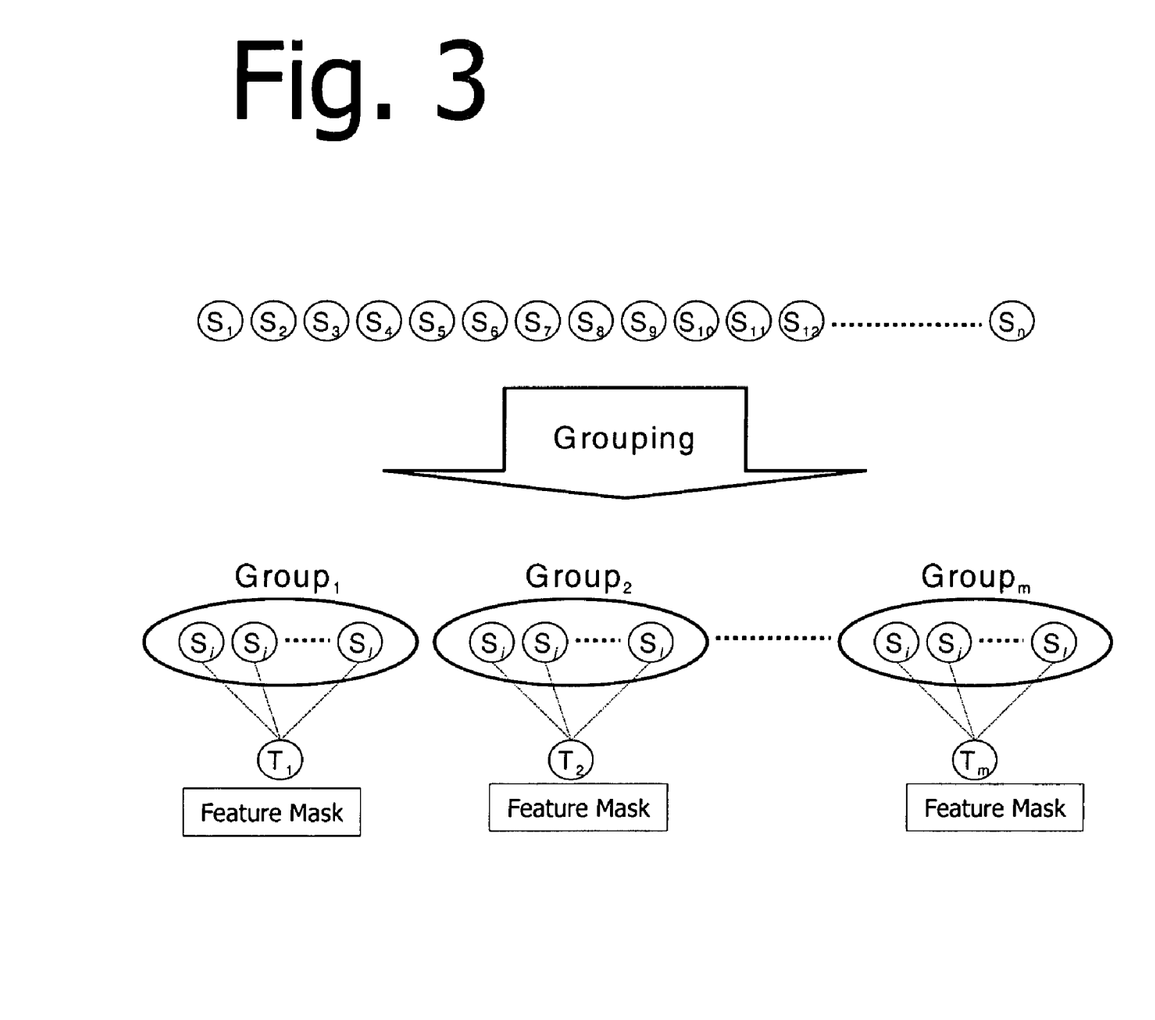
FIG. 3 is a diagram that illustrates an example of groupings of signature strings according to an embodiment of the present invention.

FIG. 3 is a diagram that illustrates an example of groupings of signature strings according to an embodiment of the present invention. Signature strings $S_1, S_2, S_3, \ldots S_n$ in the signature database are separated into m groups. Common features (feature mask) are detected for each group, for example common feature $T_1$ for $Group_1$, common feature $T_2$ for $Group_2$, ... and common feature $T_m$ for $Group_m$. The input strings are compared with each common feature $T_i$ with respect to each group. If the input strings do not have common features, then they will not have common substrings with the signature database. If the input strings do share common features, then the input strings and signature strings in that group may have common substrings, and the input strings are then directly compared with the signature strings therein to determine if any of them match. If there is a match, appropriate remedial action, such as purging the suspect data from the system, will be undertaken as a result.

The common features may be mathematically represented by feature functions F( ), wherein the strings in the same group share the same feature function, and the feature functions for any two groups are distinct. If the feature function for an input string (F(input string)) is not the same as the feature function for any signature group (F($Group_i$)), then that input string does not match that signature group. It is desirable to provide a number of strings for each signature group that is the same or approximately the same.

Figure 4:
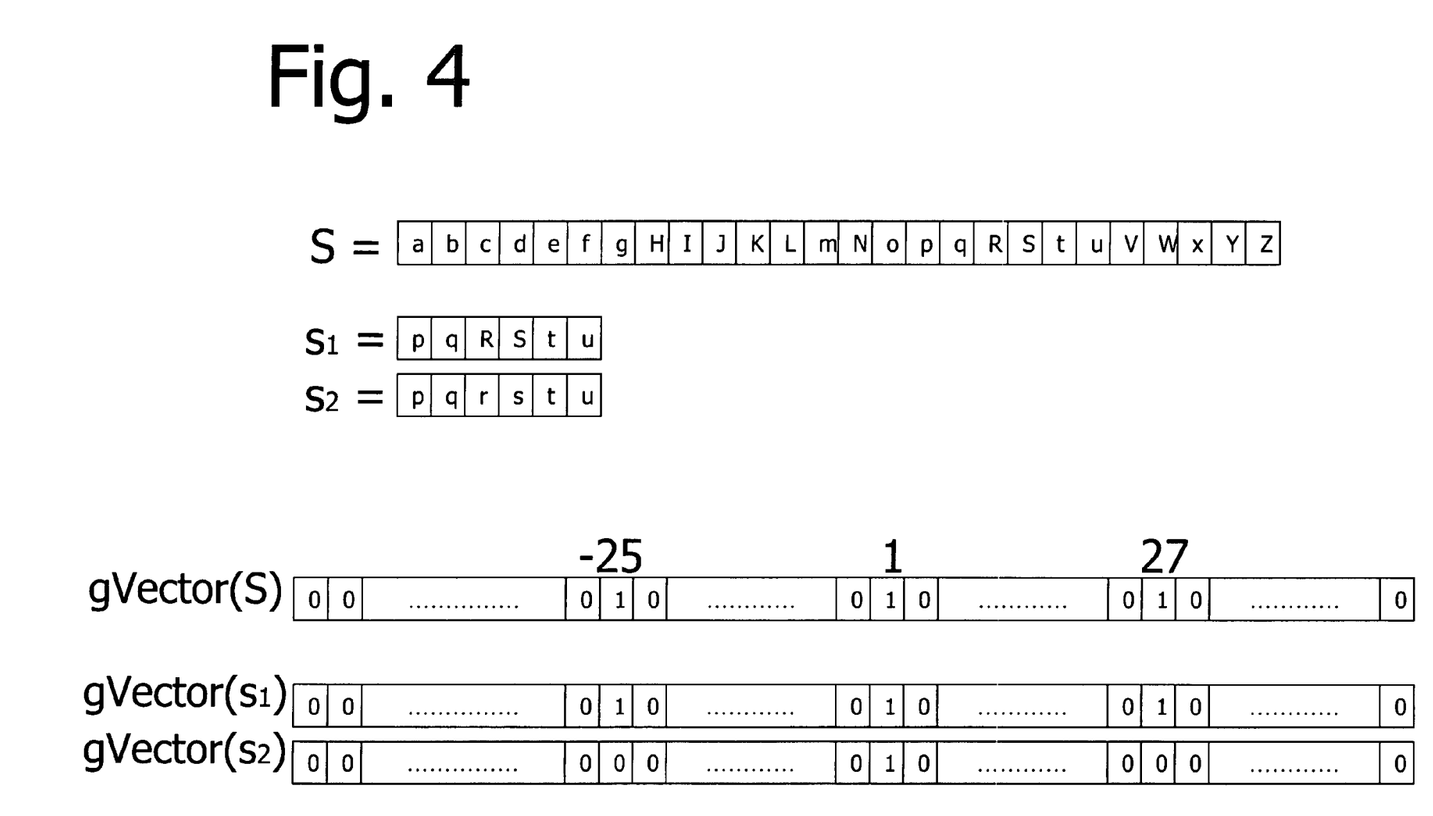
FIG. 4 is a diagram that illustrates an example of processing common features (such as gap vectors) for signature strings and input strings according to an embodiment of the present invention.

FIG. 4 is a diagram that illustrates an example of processing common features for groupings of signature strings according to an embodiment of the present invention. Before detecting common features in the strings, a sample space S is defined, such as a space of 256 characters. Character strings have a large number of possible characters. One example of a defined sample space S will be the alphabet, namely, S={a,b, c, ... z}. Characters other than the letters of the alphabet (such as "/" and ":") are assumed to not be included in the sample space of the present example. A value rank is given to each element in the sample space S, e.g., rank(a)=1, rank(b)=2, rank(c)=3, ... rank(z)=26 for S={a,b,c, ... z}. A string T is composed of i+1 characters and it can be presented as $t_0 t_1 t_2 \ldots t_i$. A gap is defined for each character pairing, i.e., $gap_i = rank(t_i + 1) - rank(t_i)$. For example, if $t_2$="b", $t_3$="c", then $gap_2 = rank(c) - rank(b) = 3 - 2 = 1$. For the strings, A string T will have i gaps and the gaps are then quantified in gap vectors V, namely $(V_{-(|S|-1)}, \ldots, V_0, \ldots, V_{(|S|-1)})$, where if $gap_i = k$, $-(|S|-1) \leq k \leq (|S|-1)$, then $V_k = 1$ else $V_k = 0$. This gap vector V can be identified as a string T, where each V is a separate vector. Gap vectors are calculated for the plurality of signature strings in the signature database. As an example, input string S and signature strings $s_1$ and $s_2$ are shown in FIG. 4 to have related gap vectors gVector(S), gVector($s_1$), and gVector($s_2$). Gap vectors of strings S and string $s_1$ having the same gap value, e.g., by matching the gap vectors, indicate that string $s_1$ is probably a sub-string of string S.

Figure 5:
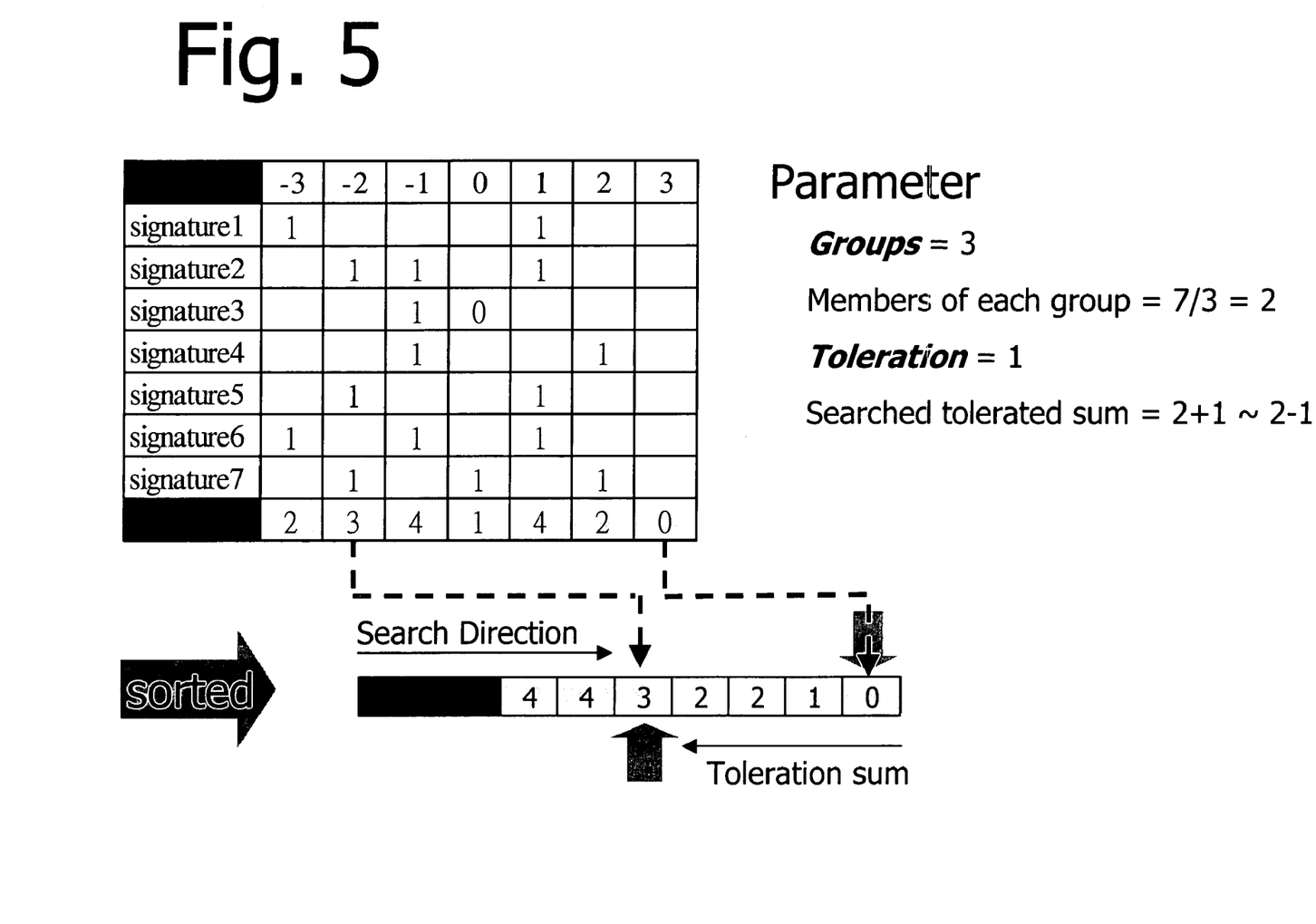
FIG. 5 is a diagram that illustrates a gap vector matrix formed from common features of character gaps for groupings of signature strings according to an embodiment of the present invention.

FIG. 5 illustrates an example of a gap vector matrix formed from the gap vectors. Grouping consistent with the present example is grouping of those signature strings having some of the same gap value. Moreover, all gap values of a signature string can be quantified as gap vectors. Referring to FIG. 5, the number of signature strings having gap=−3 is 2 (i.e., signature strings 1 and 6), those having gap=−2 is 3 (i.e., signature strings 2, 5 and 7), those having gap=−1 is 4 (i.e., signature strings 2, 3, 4 and 6), those having gap=0 is 1 (i.e., signature string 7), those having gap=1 is 4 (i.e., signature strings 1, 2, 5 and 6), those having gap=2 is 2 (i.e., signature strings 4 and 7), and those having gap=3 is 0.

A number g of groupings for separating n signature strings is then determined. The average number of strings per group is $\delta=n/g$, where a tolerance value $\Delta=\delta*\alpha$ for tolerance $\alpha$. For example, assuming a tolerance of 0.5, if the number of groups is 3, there will be an average of 7/3=2 strings for each group, where the tolerance value $\Delta=2*0.5=1$. This means there is a search tolerated sum of 2+1 or 2−1. The number of signature strings having a gap value is obtained, and then these numbers are sorted from high to low. Finally, by referencing average number (2) per group and tolerance value (1), the numbers can be searched from high to low to find purpose numbers.

Figure 6:
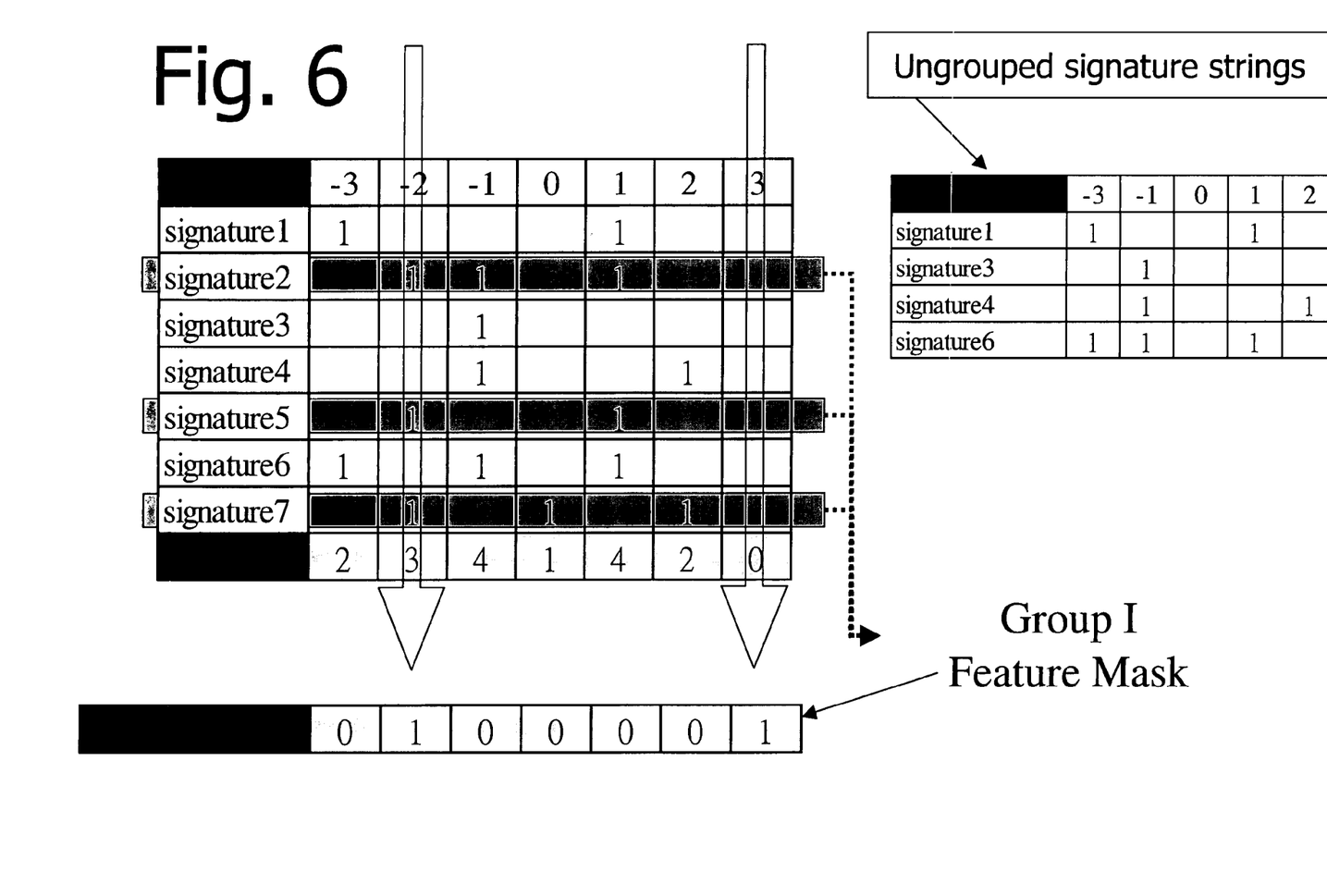
FIG. 6 is a diagram showing an example of a first feature mask formed from a gap vector matrix in a system according to an embodiment of the present invention.

FIG. 6 is a diagram showing an example of a feature mask formed from a gap vector matrix as shown in FIG. 5. By referencing to an average number of entries per group in the matrices and an associated tolerance value, a purpose gap value is determined by searching the numbers from high to low. After selecting and deciding the purpose gap value then, gap vectors of signature strings having these selected gap value are grouped together. After selecting and determining a purpose gap value, gap vectors of signature strings having the selected gap value are grouped together. Ungrouped signature strings are shown on the right side of FIG. 6. FIG. 6 shows signature 2, signature 5 and signature 7 having gap value=−2 and none of gap value=3 belong to the same group ("Group I"), and that they are removed from the gap vector matrix. From those gap values (gap value=−2 and none of gap value=3), a feature mask of 0, 1, 0, 0, 0, 0, 1 is formed ("Group I"). This process is repeated for each column in the matrix of ungrouped vector gap.

Figure 7:
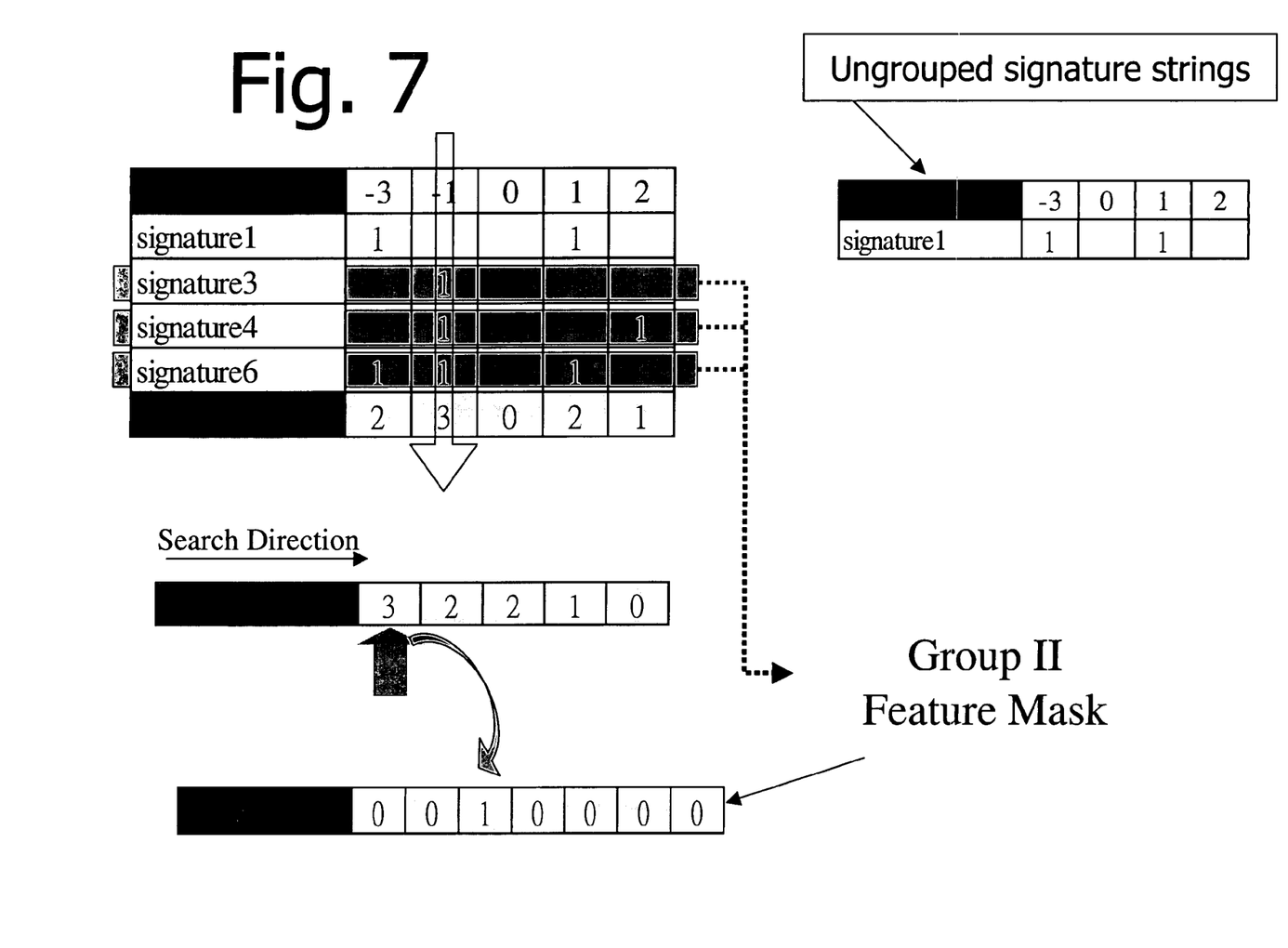
FIG. 7 is a diagram showing above example of a second feature mask formed from a gap vector matrix in a system according to an embodiment of the present invention.

FIG. 7 is a diagram showing another example of a feature mask (0, 0, 1, 0, 0, 0, 0) ("Group II") formed from a gap vector matrix of ungrouped signature strings. For a gap vector matrix of ungrouped signature strings, the number of signature strings having gap value=−3 is 2 (i.e., signature strings 1 and 6), those having gap value=−1 is 3 (i.e., signature strings 3, 4 and 6), those having gap value=1 is 2 (i.e., signature strings 1 and 6), those having gap value=2 is 1 (i.e., signature string 4), and those having gap value=3 is 0. To repeat the grouping method in the FIG. 6, we sort these numbers from high to low. And then to reference to average number (2) of per group and tolerance value (1), we can search and find the purpose numbers 3 (gap value=−1) from high to low. From the gap value (gap value=−1), a feature mask of (0, 0, 1, 0, 0, 0, 0) is formed ("Group II").

Figure 8:
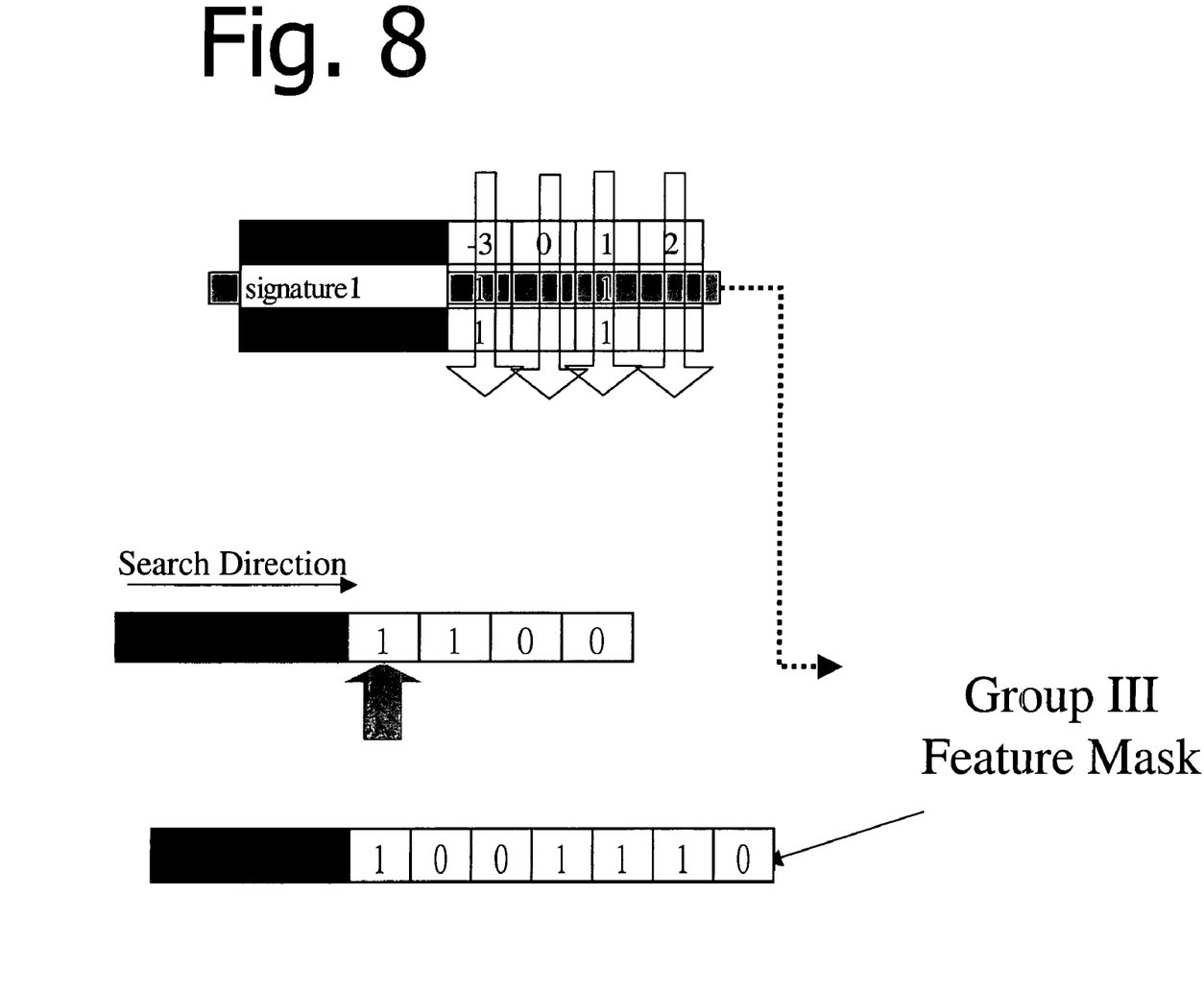
FIG. 8 is a diagram showing above example of a third feature mask formed from a gap vector matrix in a system according to an embodiment of the present invention.

FIG. 8 is a diagram showing yet another example of a feature mask (1, 0, 0, 1, 1, 1, 0) ("Group III") formed from a gap vector matrix of ungrouped signature strings. For a gap vector matrix of ungrouped signature strings, the number of signature strings having gap=−3 is 1 (i.e., signature string 1), those having gap=1 is 0, those having gap=2 is 1 (i.e., signature string 1), and those having gap=3 is 0. To repeat the grouping method in the FIG. 6, we sort these numbers from high to low. And then to reference to average number (2) of per group and tolerance value (1), we can search and select the purpose numbers (gap value=−3, 0, 1, 2) from high to low. From those gap values (gap value=−3, 0, 1, 2), a feature mask of (1, 0, 0, 1, 1, 1, 0) is formed ("Group III").

Figure 9:
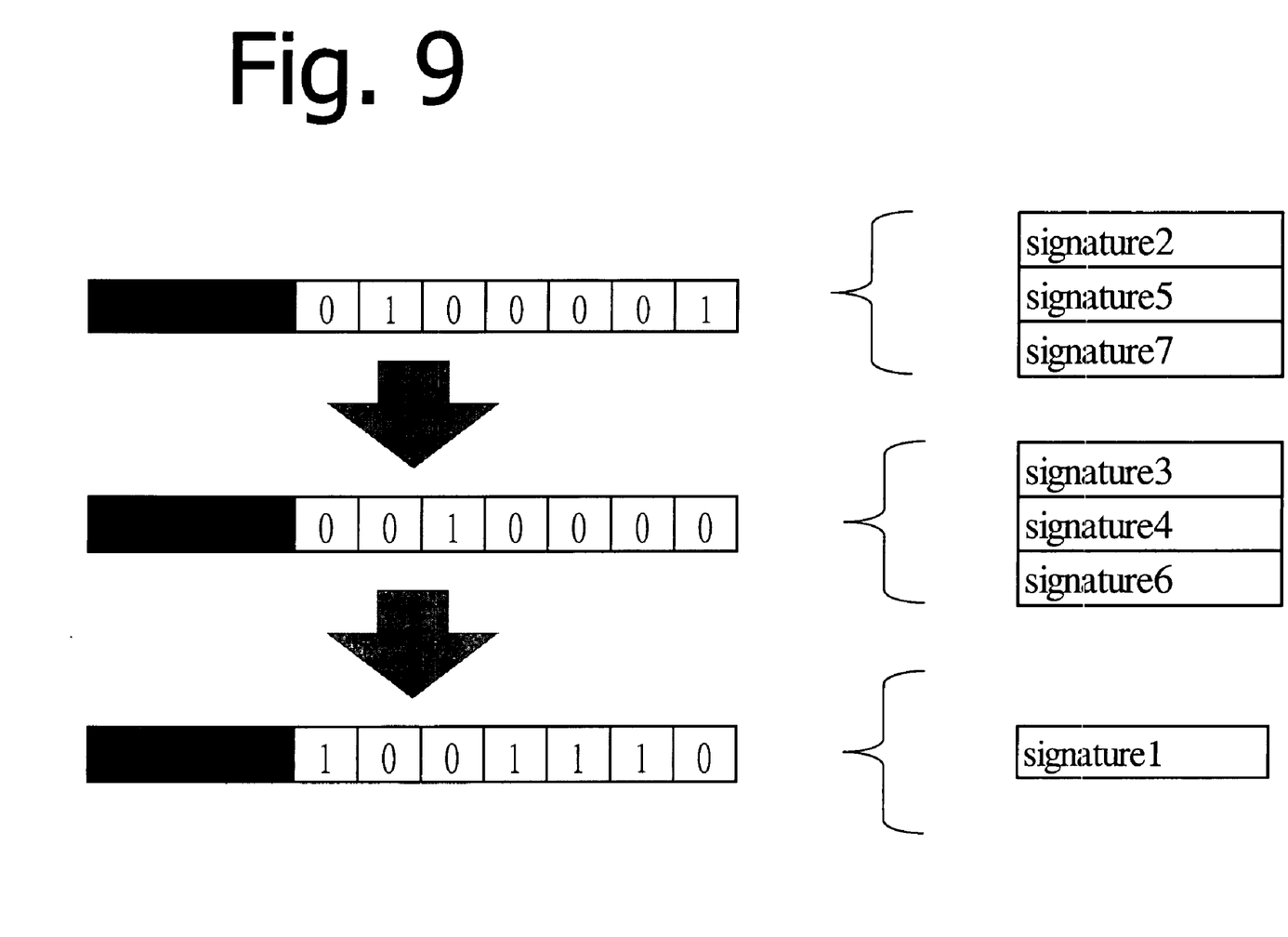
FIG. 9 is a diagram collectively showing above example of three feature masks formed from a gap vector matrix in a system according to an embodiment of the present invention.

FIG. 9 is a diagram collectively showing three feature masks ("Groups I, II and III") formed from a gap vector matrix, where Group I corresponds to signature strings 2, 5, 7, Group II to signature strings 3, 4, 6, and Group III to signature string 1.

Figure 10:
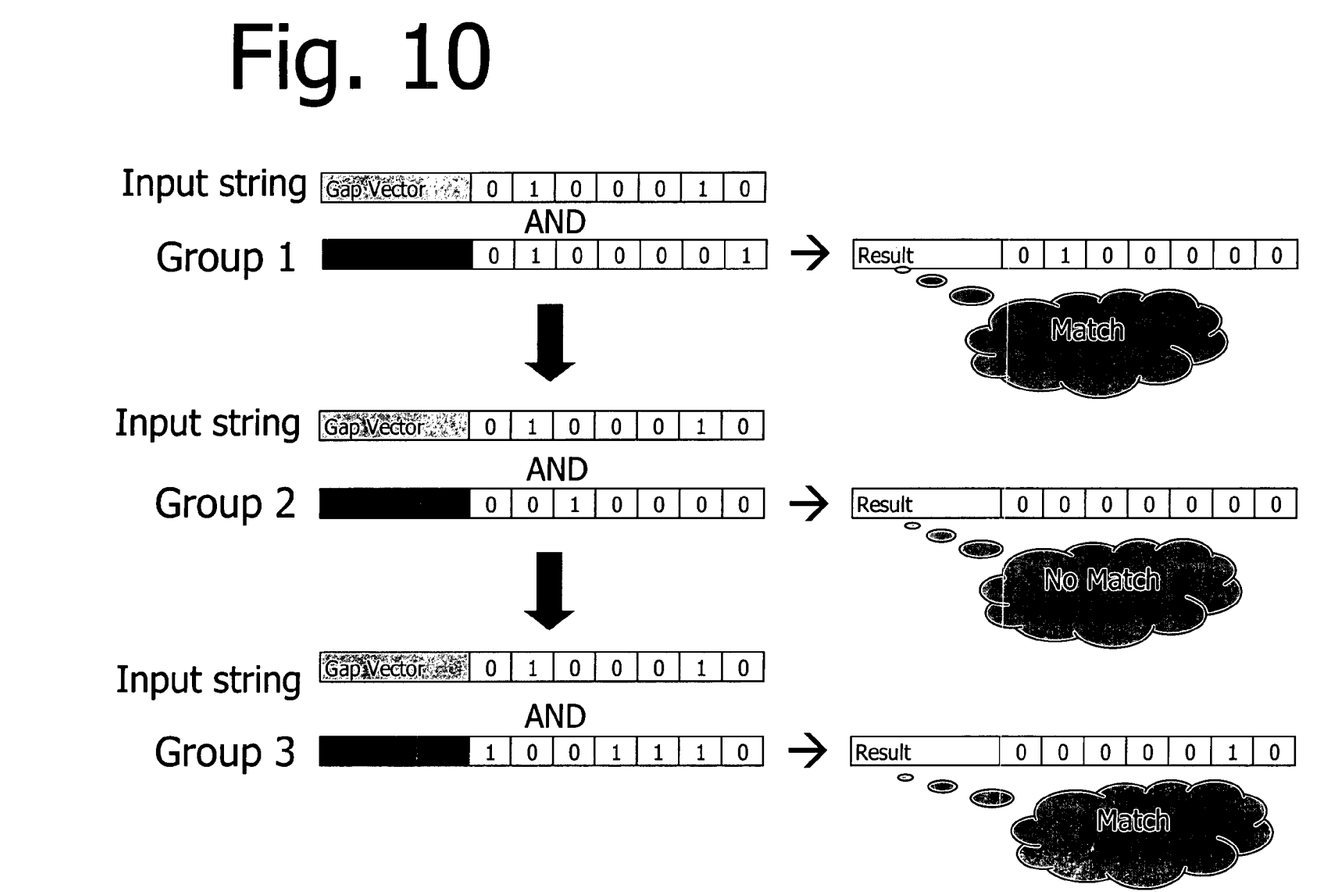
FIG. 10 is a diagram showing above example of the comparison between the respective feature masks of groups of signature strings and a gap vector of an input string according to an embodiment of the present invention.

FIG. 10 is a diagram showing an example of the comparison between the respective feature masks of groups of signature strings and a gap vector of an input string. The gap vector for the input string is detected by detector 103 (in FIG. 4), and compared with each feature mask of the signature groups, namely Groups I, II and III. Referring to FIG. 10, comparisons (e.g., using an AND gate, a process shown in FIG. 2, in a system according to an embodiment) between the gap vector of an input string and feature masks Group I and Group III of the signature strings confirms a match. Comparison between the same gap vector of the input string with feature mask Groups II result in no match. If there is no match, there is no string similarity. If there is a match, similarity between the input string and one of the signature strings is confirmed. The input strings that match any of the signature strings are purged from the system. If a gap vector of an input string and feature masks for the groupings of signature strings are a match, the input string may contain signature string in these groupings. Character-to-character comparison is performed between the input string and signature string of these matched groupings.

Other embodiments of the present invention will be apparent to those skilled in the art from consideration of the specification and practice of the present invention disclosed herein. It is intended that the specification and examples be considered as exemplary only, with a true scope and spirit of the present invention being indicated by the following claims.

We claim:

1. A computer data system, comprising:
    a database storing a plurality of signature strings;
    a memory storing computer instructions;
    a processor configured to execute the computer instructions to perform the operations of:
        assigning values to characters in the signature strings;
        calculating differences between the assigned values of the characters in the signature strings;
        identifying common features of the signature strings using the calculated differences;
        grouping the signature strings into signature groups according to the common features;
        receiving an input string into the memory;
        detecting predetermined features of the input string;
        comparing the predetermined features of the input string with the common features of one or more of the signature groups; and
        comparing the input string with one or more individual signature strings in one of the signature groups if the predetermined features of the input string match the common features of the one of the signature groups.

2. The computer system of claim 1, wherein the processor is further configured to:
    form first gap vectors representing the common features of the signature strings; and
    form a second gap vector representing the predetermined features of the input string.

3. The computer system of claim 2, wherein the processor is further configured to:
    use the first gap vectors to group the signature strings into the signature groups.

4. The computer system of claim 2, wherein the processor is further configured to:

form feature masks using the first gap vectors, wherein each of the feature masks represents a different one of the signature groups.

5. The computer system of claim 4, wherein the processor is further configured to:
compare the second gap vector of the input string with one or more feature masks of the signature groups.

6. The computer system of claim 1, wherein the processor is further configured to:
utilize an AND gate for comparing the predetermined features of the input string with the common features of one or more of the signature groups.

7. The computer system of claim 1, wherein the processor is further configured to:
select a sample space for the predetermined features of the input string and the common features of the signature strings.

8. The computer system of claim 1, wherein the processor is further configured to:
purge the input string if the input string matches one of the signature strings.

9. A computer-implemented string matching method, comprising the steps performed by a computer of:
storing a plurality of signature strings in a database;
assigning values to characters in the signature strings;
calculating differences between the assigned values of the characters in the signature strings;
identifying common features of the signature strings using the calculated differences;
grouping the signature strings into signature groups according to the common features;
receiving an input string into a memory;
detecting predetermined features of the input string;
comparing the predetermined features of the input string with the common features of one or more of the signature groups; and
comparing the input string with one or more individual signature strings in one of the signature groups if the predetermined features of the input string match the common features of the one of the signature groups.

10. The method of claim 9, further comprising:
forming first gap vectors representing the common features of the signature strings; and
forming a second gap vector representing the predetermined features of the input string.

11. The method of claim 10, wherein the grouping further comprises:
using the first gap vectors to group the signature strings into the signature groups.

12. The method of claim 10, further comprising:
forming feature masks using the first gap vectors, each feature mask representing a different one of the signature groups.

13. The method of claim 12, further comprising:
comparing the second gap vector of the input string with one or more feature masks of the signature groups.

14. The method of claim 9, further comprising:
selecting a sample space for the predetermined features of the input string and the common features of the signature strings.

15. The method of claim 9, further comprising:
updating the signature strings.

16. The method of claim 9, further comprising:
purging the input string if the input string matches one of the signature strings.

17. A tangible computer-readable storage medium containing instructions which, when executed by a processor, cause the processor to perform a string matching method, the method comprising:
storing a plurality of signature strings in a database;
assigning values to characters in the signature strings;
calculating differences between the assigned values of the characters in the signature strings;
identifying common features of the signature strings using the calculated differences;
grouping the signature strings into signature groups according to the common features;
receiving an input string into a memory;
detecting predetermined features of the input string;
comparing the predetermined features of the input string with the common features of one or more of the signature groups; and
comparing the input string with one or more individual signature strings in one of the signature groups if the predetermined features of the input string match the common features of the one of the signature groups.

18. The tangible computer-readable storage medium of claim 17, the method further comprising:
forming first gap vectors representing the common features of the signature strings; and
forming a second gap vector representing the predetermined features of the input string.

19. The tangible computer-readable storage medium of claim 18, the method further comprising:
using the first gap vectors to group the signature strings into the signature groups.

20. The tangible computer-readable storage medium of claim 18, the method further comprising:
forming feature masks using the first gap vectors, each feature mask representing a different one of the signature groups.

21. The tangible computer-readable storage medium of claim 20, the method further comprising:
comparing the second gap vector of the input string with one or more feature masks of the signature groups.

22. The tangible computer-readable storage medium of claim 17, the method further comprising:
selecting a sample space for the predetermined features of the input string and the common features of the signature strings.

23. The tangible computer-readable storage medium of claim 17, the method further comprising:
updating the signature strings.

24. The tangible computer-readable storage medium of claim 17, the method further comprising:
purging the input string if the input string matches one of the signature strings.

* * * * *

UNITED STATES PATENT AND TRADEMARK OFFICE
CERTIFICATE OF CORRECTION

PATENT NO.       : 7,574,742 B2                                         Page 1 of 1
APPLICATION NO.  : 10/986865
DATED            : August 11, 2009
INVENTOR(S)      : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1067 days.

Signed and Sealed this

Seventh Day of September, 2010

David J. Kappos
*Director of the United States Patent and Trademark Office*